(12) United States Patent
Fujiu et al.

(10) Patent No.: US 10,227,096 B2
(45) Date of Patent: Mar. 12, 2019

(54) RECTIFYING DEVICE

(71) Applicant: SUBARU CORPORATION, Tokyo (JP)

(72) Inventors: Yuji Fujiu, Tokyo (JP); Ryuya Kobayashi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/724,399

(22) Filed: Oct. 4, 2017

(65) Prior Publication Data
US 2018/0093720 A1  Apr. 5, 2018

(30) Foreign Application Priority Data

Oct. 5, 2016  (JP) .................. 2016-197260

(51) Int. Cl.
*B62D 35/02* (2006.01)
*B60G 7/00* (2006.01)

(52) U.S. Cl.
CPC ............... *B62D 35/02* (2013.01); *B60G 7/00* (2013.01)

(58) Field of Classification Search
CPC ......... B62D 35/02; B62D 35/008; B60G 7/00
USPC ..................................... 296/180.1
See application file for complete search history.

(56) References Cited

U.S. PATENT DOCUMENTS

| | | | |
|---|---|---|---|
| 4,979,597 A | 12/1990 | Mehlitz | |
| 5,954,405 A | 9/1999 | Toman | |
| 6,712,425 B2 * | 3/2004 | Brulhart | B62D 25/18 296/180.1 |
| 7,337,884 B2 * | 3/2008 | Paulik | F16D 65/847 188/264 A |
| 9,840,290 B2 * | 12/2017 | Hasegawa | B62D 35/02 |
| 9,902,225 B2 * | 2/2018 | Riegelsberger | B60G 7/001 |
| 2007/0096420 A1 * | 5/2007 | Lounsberry | B60G 7/001 280/124.134 |
| 2014/0306418 A1 * | 10/2014 | Ottinger | B60G 7/001 280/124.153 |
| 2015/0266522 A1 * | 9/2015 | Ishikawa | B62D 35/02 296/180.1 |

(Continued)

FOREIGN PATENT DOCUMENTS

| | | |
|---|---|---|
| JP | S53-078725 U1 | 2/1976 |
| JP | H09-175351 A | 7/1997 |

(Continued)

OTHER PUBLICATIONS

Chinese Office Action issued for corresponding Chinese Application No. 201710927389.8 dated Jan. 2, 2019.

*Primary Examiner* — Gregory A Blankenship
(74) *Attorney, Agent, or Firm* — Troutman Sanders LLP

(57) ABSTRACT

A rectifying device is provided in a vehicle. The vehicle includes a wheel, a housing, and a lower arm. The wheel includes a tire and a rim. The housing is provided with a hub bearing that rotatably supports the wheel. The lower arm is swingably coupled to a vehicle-body lower portion and a lower portion of the housing and extends substantially along a vehicle width direction. The rectifying device includes an inward deflector. The inward deflector is provided at the lower arm and configured to deflect an airflow flowing in from a vehicle front side so that a speed component inward in the vehicle width direction of the airflow increases.

20 Claims, 6 Drawing Sheets

(56) References Cited

U.S. PATENT DOCUMENTS

| | | | |
|---|---|---|---|
| 2016/0096409 A1* | 4/2016 | Bromme | F16D 65/128 |
| | | | 280/124.134 |
| 2016/0280289 A1* | 9/2016 | Watanabe | B62D 35/02 |
| 2017/0057567 A1* | 3/2017 | Aoki | B62D 37/02 |
| 2017/0129552 A1* | 5/2017 | Han | B62D 35/02 |
| 2018/0093720 A1* | 4/2018 | Fujiu | B62D 35/02 |

FOREIGN PATENT DOCUMENTS

| | | |
|---|---|---|
| JP | 2004-338458 A | 12/2004 |
| JP | 2009-241910 A | 10/2009 |

\* cited by examiner

FIG. 5

RECTIFYING DEVICE

CROSS-REFERENCE TO RELATED APPLICATIONS

The present application claims priority from Japanese Patent Application No. 2016-197260 filed on Oct. 5, 2016, the entire contents of which are hereby incorporated by reference.

TECHNICAL FIELD

The present invention relates to rectifying devices that rectify airflows around wheels of automobiles, and more particularly relates to a rectifying device that prevents an increase in air resistance caused by an airflow passing an inner-diameter side of a rim of a wheel.

Airflows (called travel wind) are formed in an automobile such as a car. The airflows flow around a vehicle body during traveling of a vehicle.

There have been suggested various rectifying devices that rectify such airflows and improve desirable performance of vehicles.

As related art for a rectifying device provided on a vehicle, for instance, Japanese Unexamined Patent Application Publication (JP-A) No. 9-175351 describes that an air guide element is disposed at a wheel control arm of a suspension, at an attack angle with respect to an airflow in order to cool a wheel brake.

JP-A No. 2004-338458 describes that a chipping prevention cover that protrudes forward and has a rectifying effect is provided at a lateral arm of a suspension, rectifies an airflow in a vehicle-body lower portion and hence decreases the air resistance, and improves fuel efficiency and running performance.

During traveling of a vehicle, the air flows into a wheel house that houses a wheel from below a vehicle body, an engine room, etc., and hence various airflows are generated.

If such an airflow blows out from the inner-diameter side to the vehicle-body side-surface side of the rim of the wheel, the flow of the air at a vehicle-body side surface becomes turbulent, and the air resistance increases, resulting in a decrease in fuel efficiency and so forth.

SUMMARY

It is desirable to provide a rectifying device that prevents an increase in air resistance caused by an airflow passing an inner-diameter side of a rim of a wheel.

The present invention addresses the above-described problems by an addressing measure as follows.

An aspect of the present invention provides a rectifying device provided in a vehicle. The vehicle includes a wheel including a tire and a rim, a housing provided with a hub bearing that rotatably supports the wheel, and a lower arm swingably coupled to a vehicle-body lower portion and a lower portion of the housing and extending substantially along a vehicle width direction. The rectifying device includes an inward deflector provided at the lower arm and configured to deflect an airflow flowing in from a vehicle front side so that a speed component inward in the vehicle width direction of the airflow increases.

BRIEF DESCRIPTION OF THE DRAWINGS

FIG. 5 is a plan view around a front-suspension lower arm of an automobile including a rectifying device according to a third example of the present invention.

DETAILED DESCRIPTION

First Example

A rectifying device according to a first example of the present invention is described below.

The rectifying device according to the first example is provided at, for instance, a lower arm of a front suspension provided in an automobile such as a car.

Figure 1:
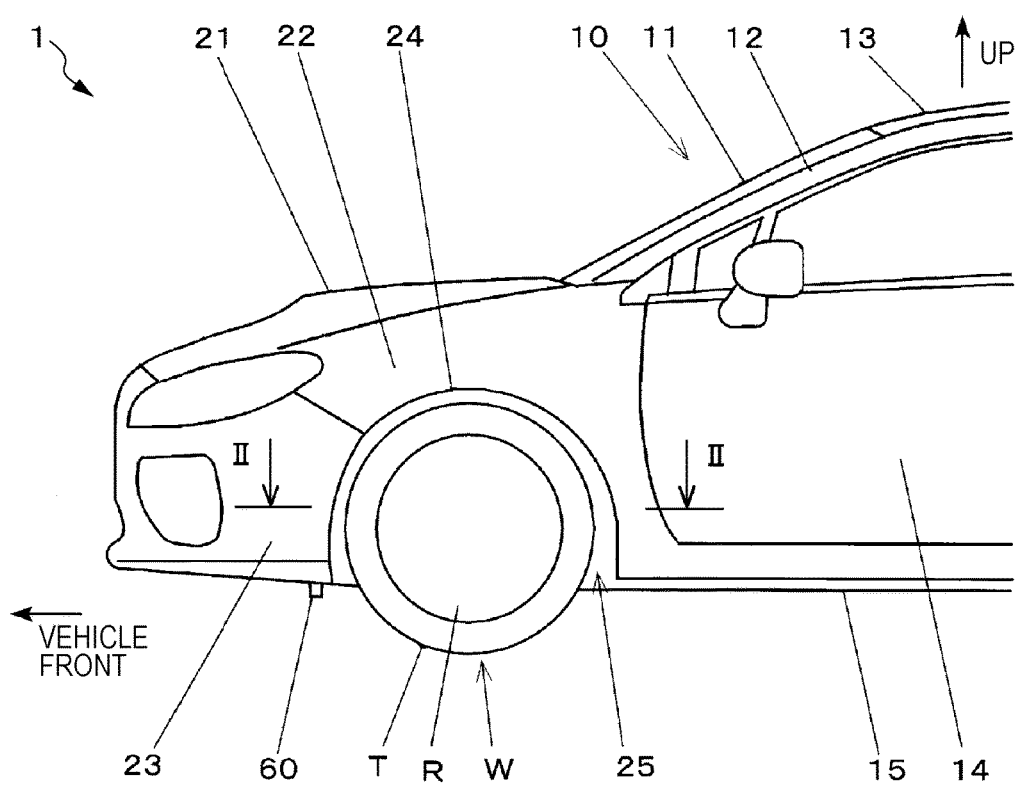
FIG. 1 is a side view of a vehicle-body front section of an automobile including a rectifying device according to a first example of the present invention.

FIG. 1 is a side view of a vehicle-body front section of an automobile including the rectifying device according to the first example.

Figure 2:
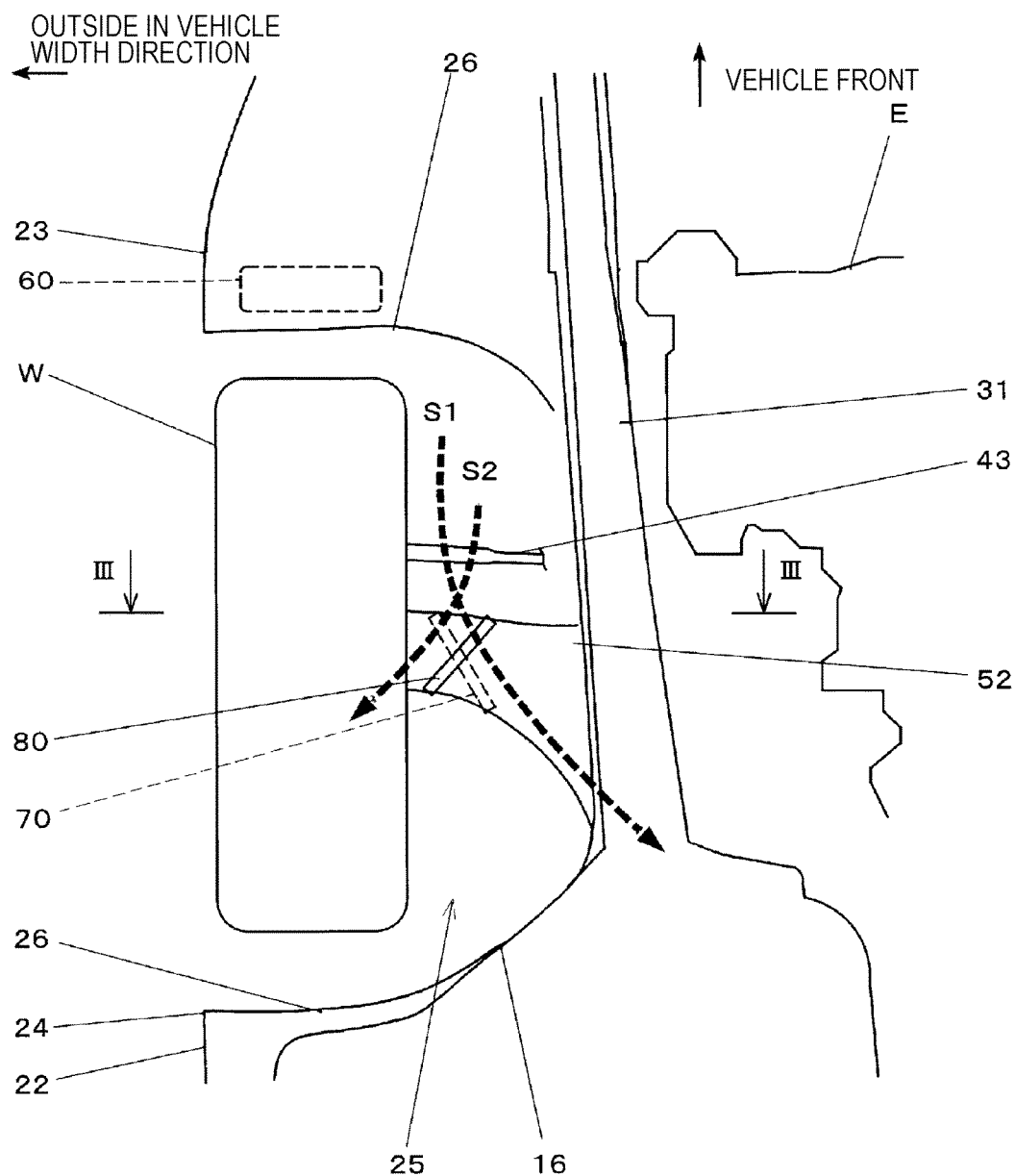
FIG. 2 is a sectional view taken along line II-II in FIG. 1.

FIG. 2 is a sectional view taken along line II-II in FIG. 1.

Figure 3:
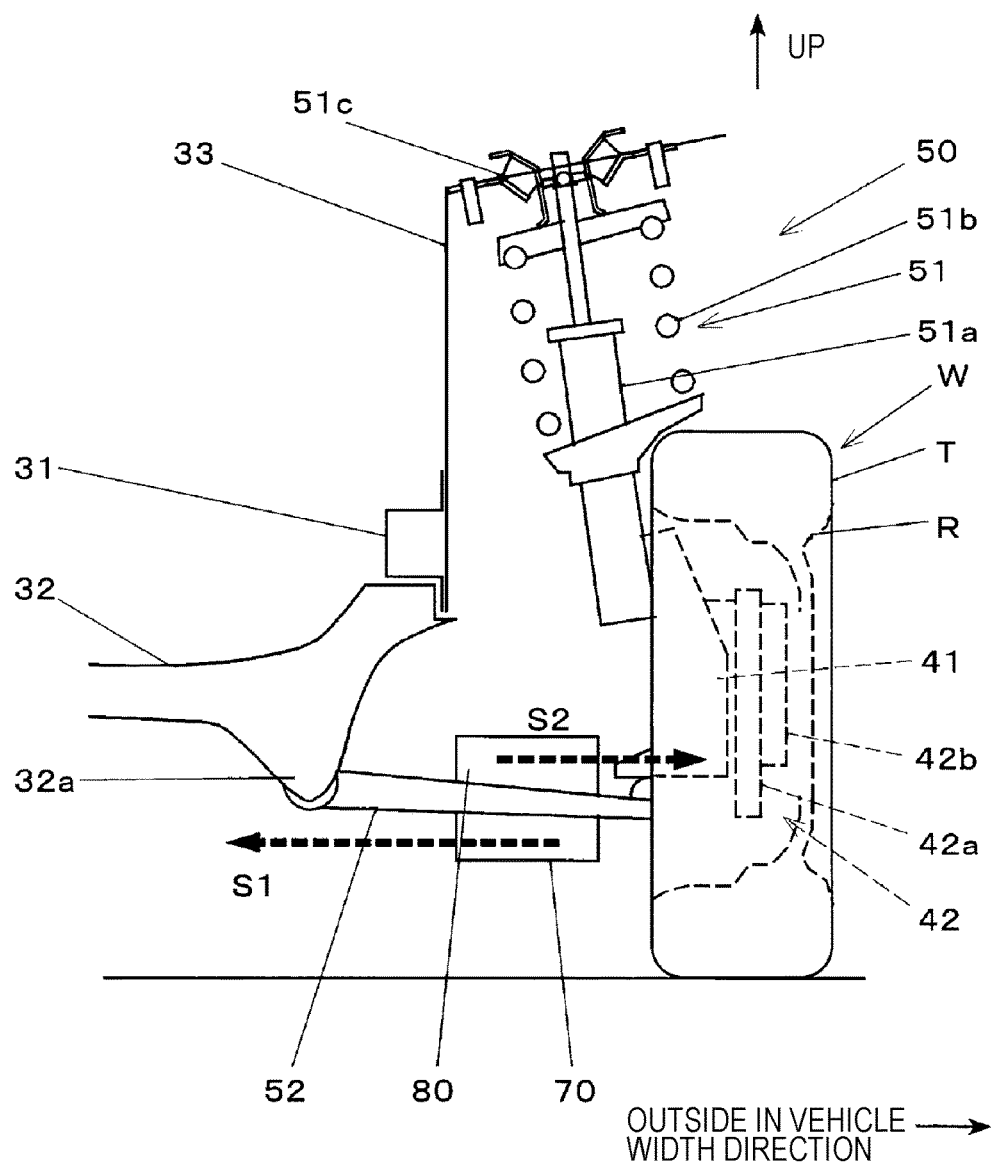
FIG. 3 is a sectional view taken along line III-III in FIG. 2.

FIG. 3 is a sectional view taken along line III-III in FIG. 2.

A vehicle 1 is a three-box or two-box car including an engine room in front of a cabin.

The vehicle 1 includes a cabin 10, a hood 21, a fender 22, a bumper face 23, a wheel arch 24, a wheel house 25, an inner fender 26, a front side frame 31, a cross member 32, a strut house 33, a housing 41, a brake 42, a tie rod 43, a suspension 50, a flap 60, a lower rectifying plate 70, and an upper rectifying plate 80.

The lower rectifying plate 70 and the upper rectifying plate 80 cooperatively configure the rectifying device according to the first example.

The cabin (vehicle cabin) 10 is a part that accommodates occupants etc.

The cabin 10 includes a windshield 11, an A pillar 12, a roof 13, a front side door 14, a floor 15, and a toe board 16.

The windshield 11 is provided in the upper half of a front portion of the cabin 10.

The A pillar 12 is a pillar-shaped member disposed along a side end portion of the windshield 11.

The roof 13 configures a ceiling part of the cabin 10, and extends rearward from an upper end portion of the windshield 11.

The front side door 14 is provided in the front half of a side surface of the cabin 10, and used for getting on and off of a front-seat occupant.

The floor 15 configures a bottom surface of the cabin 10, and has a plate-like shape extending substantially in the horizontal direction.

The toe board 16 (see FIG. 2) is a wall-like part standing on a front end portion of the floor 15 and extending upward.

The toe board 16 is provided in the lower half of the front portion of the cabin 10.

The toe board 16 functions as a partition wall that separates the cabin 10 from the engine room.

The hood 21 is an exterior member extending forward from a portion near a lower end portion of the windshield 11.

The hood 21 functions as a cover member that opens and closes an upper opening of the engine room provided in the vehicle-body front section.

The fender 22 is an exterior member that configures a side surface of the vehicle-body front section (around front wheel).

An upper end portion of the fender 22 is adjacent to a side end portion of the hood 21.

A rear end portion of the fender 22 is adjacent to a front end portion of the front side door 14.

The bumper face 23 is an exterior member provided at a lower portion of a vehicle-body front end portion.

A side end portion of the bumper face 23 extends to a vehicle side surface, and is disposed below a front end portion of the fender 22.

The wheel arch 24 includes edge portions of the fender 22 and the bumper face 23 disposed around a wheel W.

The wheel W is a front wheel of the vehicle 1. The wheel W includes, for instance, a rim R made of metal such as an aluminum-based alloy, and a tire T mounted on an outer-diameter side of the rim R.

The wheel arch 24 has an arch-like shape substantially concentric with the wheel W in vehicle side view.

The wheel house 25 is a space that houses the wheel W, and is formed in a region at the inner side of the wheel arch 24 in a vehicle width direction.

The inner fender 26 is a cover-like member made of resin disposed in the wheel house 25, along the circumferential direction of the wheel W.

The front side frame 31 is a beam-like vehicle-body structural member protruding forward from the toe board 16 of the cabin 10.

The front side frame 31 includes a pair of left and right front side frames 31 spaced apart in the vehicle width direction. The front side frames 31 serve as a base on which an engine mount (not illustrated) that supports an engine E, the cross member 32, the suspension 50, and other members are mounted.

The engine room that houses the engine E of the vehicle 1 is provided between the left and right front side frames 31.

The cross member 32 is a structural member disposed between lower portions of the left and right front side frames 31.

The cross member 32 includes a bracket 32a.

The bracket 32a is a base to which a vehicle-body-side end portion of a lower arm 52 of the suspension 50 is coupled.

The bracket 32a protrudes downward from a portion near each of left and right side-end portions of the cross member 32.

The strut house 33 is a part that houses a strut 51 of the suspension 50.

The strut house 33 has a box-like shape being open downward.

The strut house 33 is provided at the outer side of the front side frame 31 in the vehicle width direction.

The housing 41 is a member (knuckle) that houses a hub bearing (not illustrated) that rotatably supports the wheel W.

The housing 41 is disposed at an inner-diameter side of the rim R of the wheel W.

The brake 42 includes a rotor 42a that rotates together with the wheel W, and a caliper 42b mounted at the housing 41.

The rotor 42a is a disk-like member mounted at a hub and extending in a flange-like shape from the hub to an outer-diameter side of the rotor 42a. A disk (not illustrated) of the rim R of the wheel W is fastened to the hub.

The rotor 42a is a ventilated disk that has an airflow path at a center portion in the thickness direction, an air inlet port at the center portion, and an air outlet port at an outer peripheral portion. The rotor 42a allows an airflow to pass from the air inlet port to the air outlet port during traveling.

The tie rod 43 (see FIG. 2) is a rod-like member that couples a knuckle arm (not illustrated) provided at a front end portion of the housing 41 with a steering gear box (not illustrated).

The tie rod 43 pushes and pulls the knuckle arm and hence rotates the housing 41 and the strut 51 around a predetermined kingpin axis, and steers the wheel W.

The tie rod 43 is disposed substantially along the vehicle width direction, in front and above the lower arm 52 of the suspension 50.

The suspension 50 is a suspension system that supports the housing 41 relatively displaceably within the range of a predetermined suspension stroke relative to the vehicle body.

The suspension 50 is, for instance, a MacPherson strut suspension.

As illustrated in FIG. 3, the suspension 50 includes the strut 51 and the lower arm 52.

The strut 51 is an assembly part including a shock absorber 51a that is a hydraulic damper, a coil spring 51b, and a strut upper mount 51c. The strut 51 supports an upper end portion of the housing 41.

The strut 51 is disposed so that its expansion-contraction direction is substantially along the up-down direction. The strut 51 is inclined so that an upper-end-portion side thereof is at the inner side in the vehicle width direction and the rear side with respect to a lower-end-portion side thereof.

An upper end portion of the strut 51 is mounted at an upper portion of the strut house 33 via an elastic body for vibration proof and the strut upper mount 51c having a bearing that allows the strut 51 to rotate relative to the vehicle body during steering.

An upper portion of the shock absorber 51a is inserted into an inner-diameter side of the coil spring 51b.

An upper end portion of the coil spring 51b is held by a spring seat provided at the strut upper mount 51c.

A lower end portion of the coil spring 51b is held by a spring seat extending from a shell case of the shock absorber 51a to an outer-diameter side of the coil spring 51b.

A lower end portion of the strut 51 is fixed to an upper end portion of the housing 41 by a mechanical fastener, such as a bolt and a nut.

The lower arm (transverse link) 52 is a suspension arm that is swingably coupled to a lower end portion of the vehicle body and a lower end portion of the housing 41.

The lower arm 52 has an arm portion extending substantially along the vehicle width direction.

An end portion of the lower arm 52 at the vehicle-body side is coupled to the vehicle body via an elastic-body bush provided at each of two front and rear positions.

The lower arm 52 is swingable relative to the vehicle body around a rotation axis that is substantially aligned with a line connecting the front and rear elastic-body bushes.

The front elastic-body bush is mounted at the bracket 32a of the cross member 32.

An end portion of the lower arm 52 at the housing-41 side is swingable relative to the housing 41 via a ball joint (spherical bearing) provided at the lower end portion of the housing 41.

The flap 60 rectifies the airflow that strikes against the wheel W and decreases the air resistance of the vehicle 1.

The flap 60 protrudes from a vehicle-body lower portion in front of the wheel W. The flap 60 has a substantially rectangular shape in vehicle front view.

The lower rectifying plate 70 protrudes downward from the arm portion (region near wheel W) of the lower arm 52.

The lower rectifying plate 70 has a substantially rectangular plate-like shape.

A lower end portion of the lower rectifying plate 70 is disposed below a lower end portion of the flap 60 during normal traveling (1G state) of the vehicle.

As illustrated in FIG. 2, the lower rectifying plate 70 is inclined with respect to the vehicle front-rear direction so that a rear end portion thereof is at the inner side with respect to a front end portion thereof in the vehicle width direction.

The lower rectifying plate 70 is an inward deflector (inward-deflection rectifying plate) having a function of deflecting an airflow S1 flowing in from the vehicle front side so that a speed component inward in the vehicle width direction of the airflow S1 increases.

The upper rectifying plate 80 protrudes upward from the arm portion of the lower arm 52.

The upper rectifying plate 80 is disposed above the lower rectifying plate 70.

The upper rectifying plate 80 has a substantially rectangular plate-like shape.

The upper rectifying plate 80 is inclined with respect to the vehicle front-rear direction so that a rear end portion thereof is at the outer side with respect to a front end portion thereof in the vehicle width direction.

The inclination angle of the upper rectifying plate 80 with respect to the vehicle front-rear direction (attack angle with respect to airflow flowing in along vehicle front-rear direction) is set to be larger than the inclination angle (attack angle) of the lower rectifying plate 70 to reliably obtain the deflection effect also for an airflow above the lower arm 52 with a relatively low flow rate.

The upper rectifying plate 80 is an outward deflector (outward-deflection rectifying plate) having a function of deflecting an airflow S2 flowing in from the vehicle front side so that a speed component outward in the vehicle width direction of the airflow S2 increases.

With the above-described first example, the following advantages can be obtained. (1) The lower rectifying plate 70 that deflects the airflow S1 flowing in from the vehicle front side so that the speed component inward in the vehicle width direction of the airflow S1 increases is provided below the lower arm 52. Accordingly, the increase in air resistance of the vehicle, which may occur when the airflow with a relatively high flow rate flowing in the vehicle-body lower portion blows outward in the vehicle width direction from the inner-diameter side of the rim R of the wheel W, and interferes with the airflow flowing along the vehicle side surface, can be prevented. (2) The upper rectifying plate 80 that deflects the airflow S2 flowing in from the vehicle front side so that the speed component outward in the vehicle width direction of the airflow S2 increases is provided above the lower arm 52. Accordingly, the airflow with a relatively low flow rate flowing above the lower arm 52 is introduced to the inner-diameter side of the rim R, and can appropriately cool the rotor 42a and the caliper 42b of the brake 42 provided at the inner-diameter side of the rim R without markedly increasing the air resistance. (3) The lower rectifying plate 70 and the upper rectifying plate 80 have the plate-like shapes that protrude downward and upward from the lower arm 52 and are inclined with respect to the vehicle front-rear direction. Accordingly, the above-described advantages can be reliably obtained with the simple configuration. (4) The lower end portion of the lower rectifying plate 70 is disposed at the position lower than the position of the lower end portion of the flap 60. Accordingly, in the vehicle 1 including the flap 60, the airflow passing below the flap 60 is deflected inward in the vehicle width direction, and the above-described advantages can be reliably obtained.

Second Example

A rectifying device according to a second example of the present invention is described next.

In respective examples described below, the same reference sign is applied to a portion substantially common to that of the above-described example, its description is omitted, and the different point is mainly described.

Figure 4:
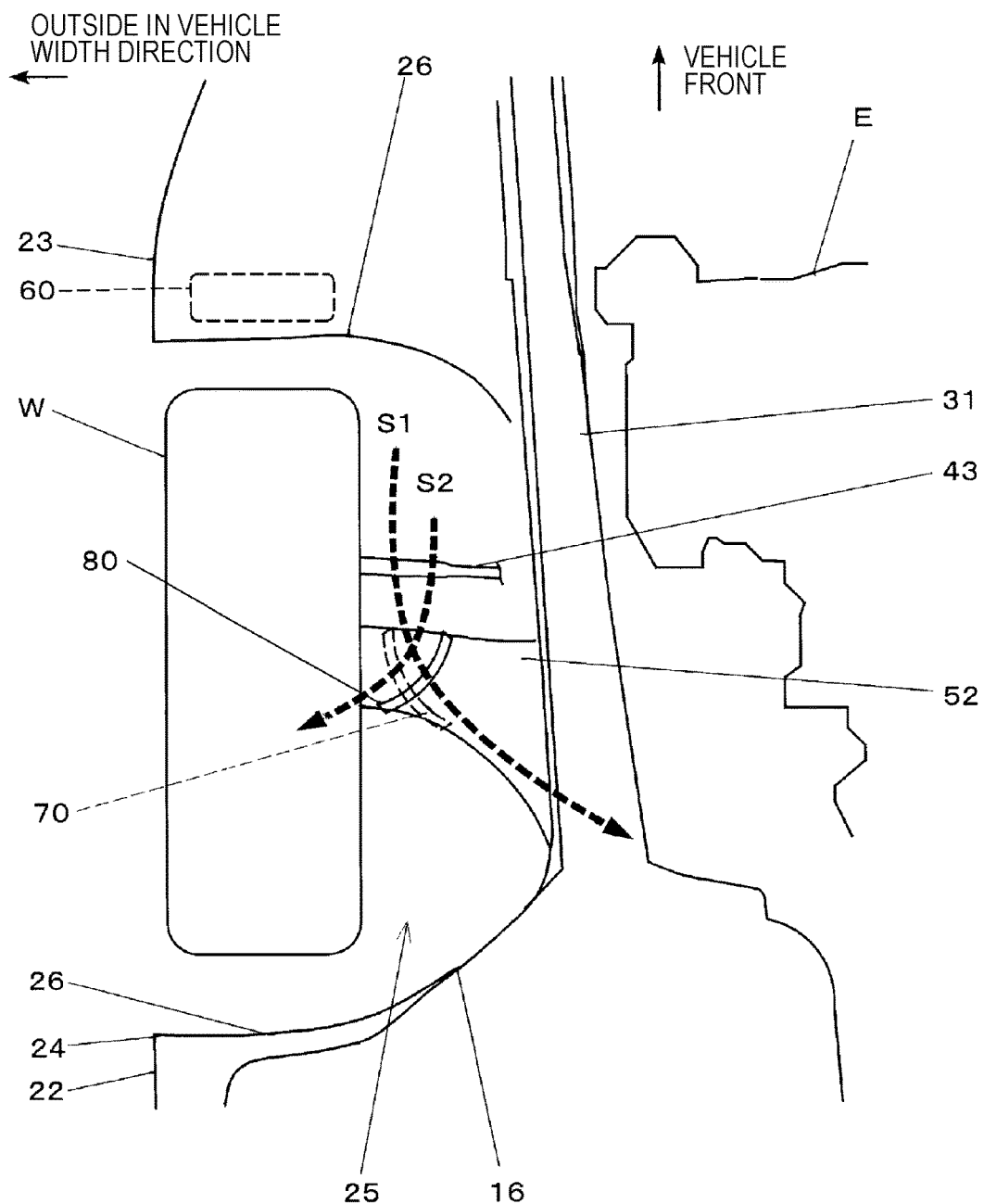
FIG. 4 is a plan view around a front-suspension lower arm of an automobile including a rectifying device according to a second example of the present invention.

FIG. 4 is a plan view of a portion near a front-suspension lower arm of an automobile including the rectifying device according to the second example (view corresponding to FIG. 2 of the first example, FIGS. 5 and 6, described later, also corresponding to FIG. 2).

In the rectifying device according to the second example, the lower rectifying plate 70 and the upper rectifying plate 80 are curved in arc-like shapes in vehicle plan view so that sides facing the vehicle front side are concave surfaces.

With the above-described second example, efficiency of the lower rectifying plate 70 and upper rectifying plate 80 is increased, and advantages substantially similar to those of the first example can be further promoted.

Third Example

A rectifying device according to a third example of the present invention is described next.

Figure 5:
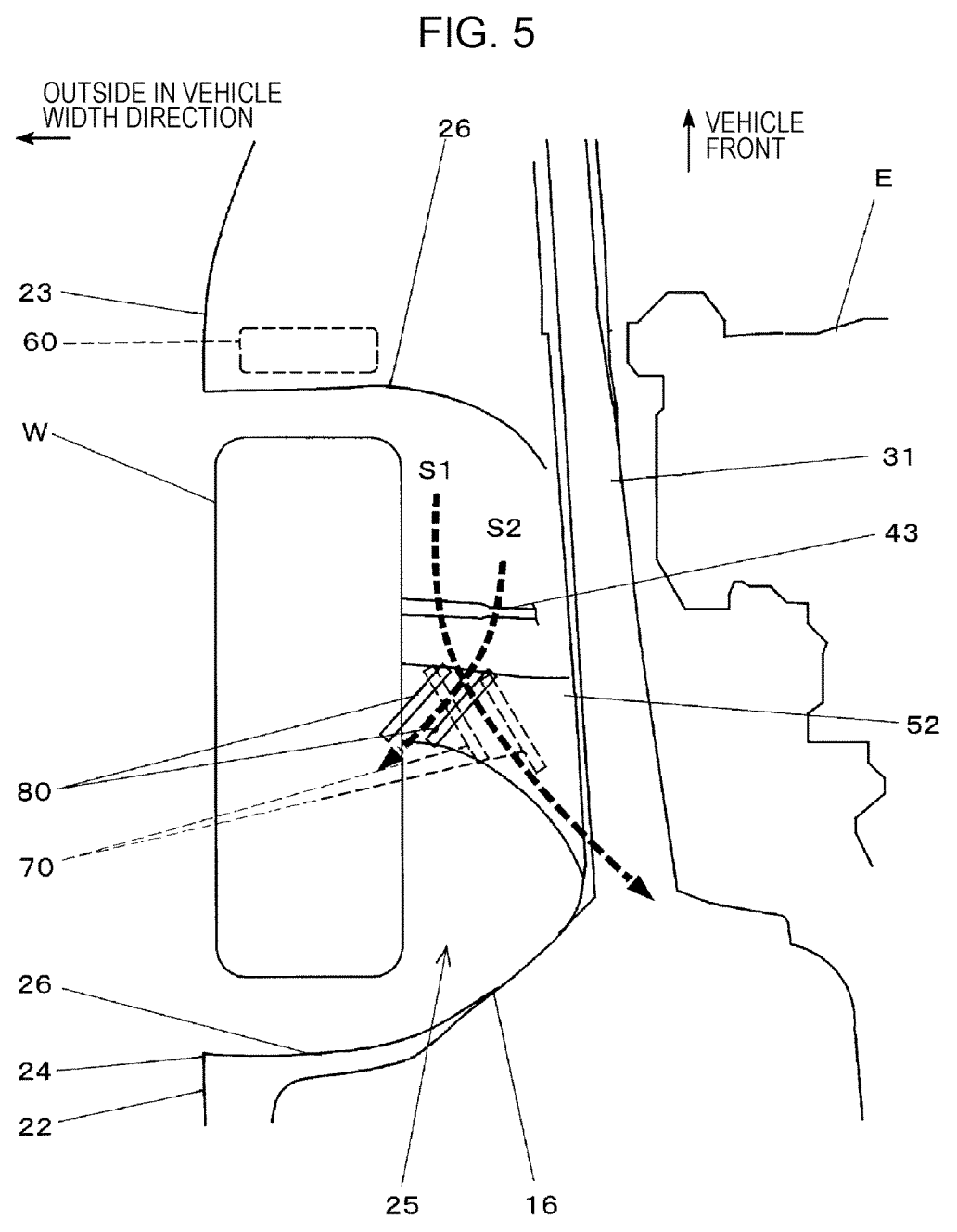

FIG. 5 is a plan view of a portion near a front-suspension lower arm of an automobile including the rectifying device according to the third example.

In the rectifying device according to the third example, a plurality of the lower rectifying plates 70 and a plurality of the upper rectifying plates 80 are disposed in the vehicle width direction.

With the above-described third example, efficiency of the lower rectifying plate 70 and upper rectifying plate 80 is increased, and advantages substantially similar to those of the first example can be further promoted.

Fourth Example

A rectifying device according to a fourth example of the present invention is described next.

Figure 6:
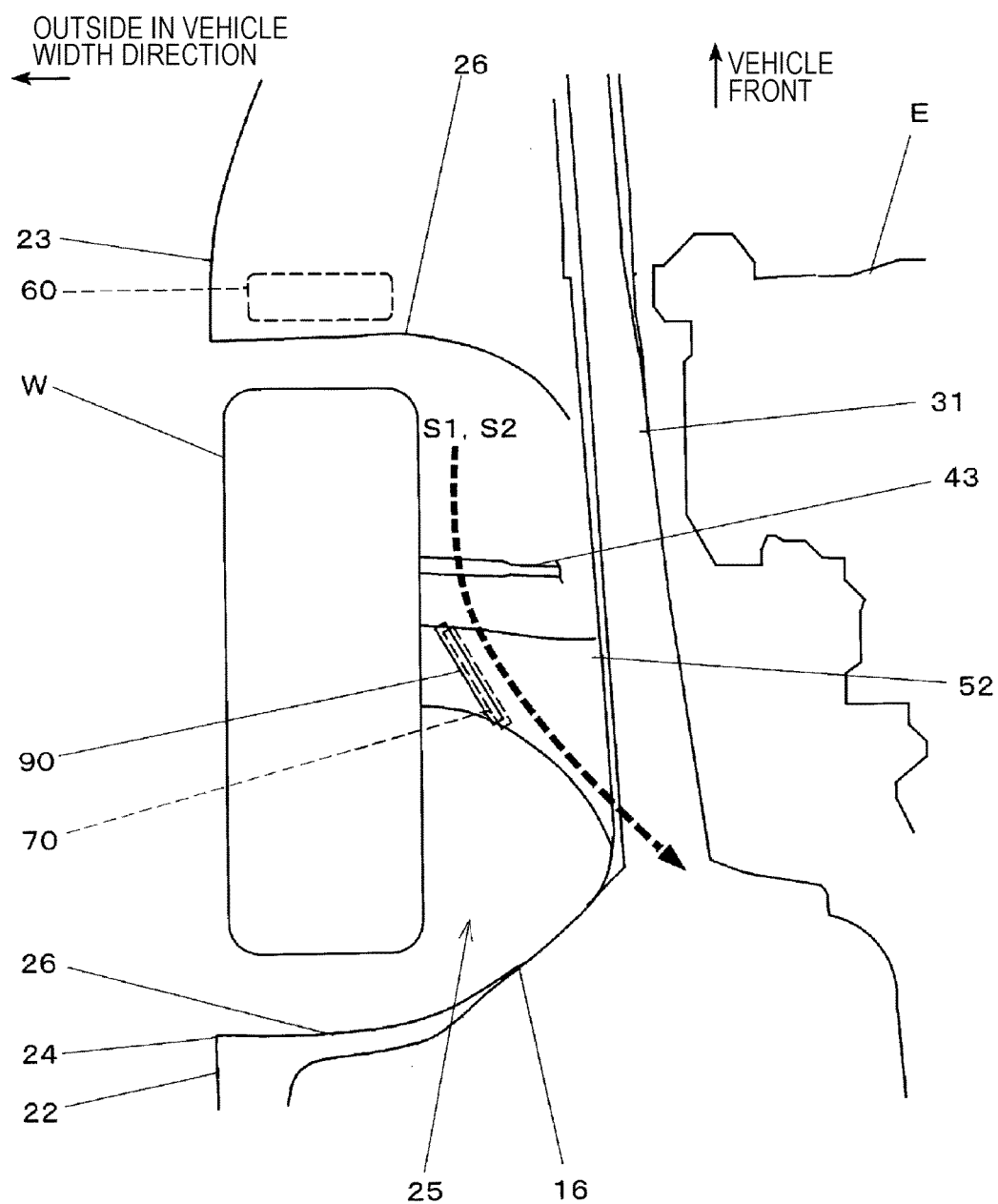
FIG. 6 is a plan view around a front-suspension lower arm of an automobile including a rectifying device according to a fourth example of the present invention.

FIG. 6 is a plan view of a portion near a front-suspension lower arm of an automobile including the rectifying device according to the fourth example.

The rectifying device according to the fourth example includes an upper rectifying plate 90, which is described below, instead of the upper rectifying plate 80 according to the first example.

The upper rectifying plate 90 protruding above the lower arm 52 is inclined with respect to the vehicle front-rear direction so that a rear end portion thereof is disposed at the outer side in the vehicle width direction with respect to a front end portion thereof similarly to the lower rectifying plate 70.

In the above-described fourth example, in a vehicle having excessive cooling performance for the brake 42 or another member, by preventing the airflow from entering the inner-diameter side of the rim R even above the lower arm 52, the airflow is reliably prevented from blowing outward in the vehicle width direction from the inner-diameter side of the rim R, and the air resistance of the vehicle can be reliably decreased.

The present invention is not limited to the above-described respective examples, and may be modified and changed in various ways. The modified and changed examples are also within the technical scope of the present invention. (1) The shapes, structures, materials, manufacturing methods, arrangement, and number of the respective members configuring the vehicle and the rectifying device are not limited to those descried in the above-described respective examples, and may be appropriately changed. (2) In the respective examples, the rectifying device is provided at the lower arm of, for instance, the front-wheel Macpherson strut suspension; however, the configuration of the suspension device is not limited thereto. The rectifying device according to the present invention may be provided at a lower arm of a double-wishbone suspension or a multi-link suspension.

Also, the rectifying device according to the present invention may be provided at a lower arm of a rear-wheel suspension device. (3) The first to third examples each have the configuration that cools the brake 42 provided at the inner-diameter side of the rim R by using the airflow S2 deflected by the upper rectifying plate 80. However, the present invention may be used for cooling another part provided at the inner-diameter side of the rim without limiting to the brake.

For instance, the present invention may be used for cooling an in-wheel motor that is used for electrical driving and regeneration of a wheel or for cooling sensors used for various vehicle controls. (4) In the respective examples, the rectifying plates are provided above and below the lower arm. However, the rectifying plate may be provided at only one of positions above and below the lower arm. For instance, in the configuration of the first example, only the lower rectifying plate 70 may be provided.

Also, another rectifying member may be provided in addition to the rectifying plates provided at the lower arm.

For instance, another rectifying member mounted at the vehicle body may be disposed at the rear side of the rectifying plate provided at the lower arm to control an airflow.

The invention claimed is:
1. A rectifying device provided in a vehicle, the vehicle comprising
  a wheel comprising a tire and a rim,
  a housing provided with a hub bearing that rotatably supports the wheel, and
  a lower arm swingably coupled to a vehicle-body lower portion and a lower portion of the housing and extending substantially along a vehicle width direction,
  the rectifying device comprising:
  an inward deflector provided at the lower arm and configured to deflect an airflow flowing in from a vehicle front side so that a speed component inward in the vehicle width direction of the airflow increases.
2. The rectifying device according to claim 1,
  wherein at least a portion of the inward deflector is at an lower portion of the lower arm.
3. The rectifying device according to claim 1,
  wherein the inward deflector comprises an inward-deflector rectifying plate protruding downward from the lower arm and inclined with respect to a vehicle front-rear direction so that a rear end portion of the inward-deflector rectifying plate is at an inner side with respect to a front end portion of the inward-deflector rectifying plate in the vehicle width direction.
4. The rectifying device according to claim 2,
  wherein the inward deflector comprises an inward-deflector rectifying plate protruding downward from the lower arm and inclined with respect to a vehicle front-rear direction so that a rear end portion of the inward-deflector rectifying plate is at an inner side with respect to a front end portion of the inward-deflector rectifying plate in the vehicle width direction.
5. The rectifying device according to claim 1, further comprising:
  an outward deflector provided at an upper portion of the lower arm and configured to deflect an airflow flowing in from the vehicle front side so that a speed component outward in the vehicle width direction of the airflow increases.
6. The rectifying device according to claim 2, further comprising:
  an outward deflector provided at an upper portion of the lower arm and configured to deflect an airflow flowing in from the vehicle front side so that a speed component outward in the vehicle width direction of the airflow increases.
7. The rectifying device according to claim 3, further comprising:
  an outward deflector provided at an upper portion of the lower arm and configured to deflect an airflow flowing in from the vehicle front side so that a speed component outward in the vehicle width direction of the airflow increases.
8. The rectifying device according to claim 4, further comprising:
  an outward deflector provided at an upper portion of the lower arm and configured to deflect an airflow flowing in from the vehicle front side so that a speed component outward in the vehicle width direction of the airflow increases.
9. The rectifying device according to claim 5,
  wherein the outward deflector comprises an outward-deflector rectifying plate protruding upward from the lower arm and inclined with respect to the vehicle front-rear direction so that a rear end portion of the outward-deflector rectifying plate is at an outer side with respect to a front end portion of the outward-deflector rectifying plate in the vehicle width direction.
10. The rectifying device according to claim 6,
  wherein the outward deflector comprises an outward-deflector rectifying plate protruding upward from the lower arm and inclined with respect to the vehicle front-rear direction so that a rear end portion of the outward-deflector rectifying plate is at an outer side with respect to a front end portion of the outward-deflector rectifying plate in the vehicle width direction.
11. The rectifying device according to claim 7,
  wherein the outward deflector comprises an outward-deflector rectifying plate protruding upward from the lower arm and inclined with respect to the vehicle front-rear direction so that a rear end portion of the outward-deflector rectifying plate is at an outer side with respect to a front end portion of the outward-deflector rectifying plate in the vehicle width direction.
12. The rectifying device according to claim 8,
  wherein the outward deflector comprises an outward-deflector rectifying plate protruding upward from the lower arm and inclined with respect to the vehicle front-rear direction so that a rear end portion of the outward-deflector rectifying plate is at an outer side with respect to a front end portion of the outward-deflector rectifying plate in the vehicle width direction.

13. The rectifying device according to claim 1,
wherein a flap protruding downward from the vehicle-body lower portion is provided in front of the wheel, and
wherein a lower end portion of the inward deflector is disposed below a lower end portion of the flap.

14. The rectifying device according to claim 2,
wherein a flap protruding downward from the vehicle-body lower portion is provided in front of the wheel, and
wherein a lower end portion of the inward deflector is disposed below a lower end portion of the flap.

15. The rectifying device according to claim 3,
wherein a flap protruding downward from the vehicle-body lower portion is provided in front of the wheel, and
wherein a lower end portion of the inward deflector is disposed below a lower end portion of the flap.

16. The rectifying device according to claim 4,
wherein a flap protruding downward from the vehicle-body lower portion is provided in front of the wheel, and
wherein a lower end portion of the inward deflector is disposed below a lower end portion of the flap.

17. The rectifying device according to claim 5,
wherein a flap protruding downward from the vehicle-body lower portion is provided in front of the wheel, and
wherein a lower end portion of the inward deflector is disposed below a lower end portion of the flap.

18. The rectifying device according to claim 6,
wherein a flap protruding downward from the vehicle-body lower portion is provided in front of the wheel, and
wherein a lower end portion of the inward deflector is disposed below a lower end portion of the flap.

19. The rectifying device according to claim 7,
wherein a flap protruding downward from the vehicle-body lower portion is provided in front of the wheel, and
wherein a lower end portion of the inward deflector is disposed below a lower end portion of the flap.

20. The rectifying device according to claim 8,
wherein a flap protruding downward from the vehicle-body lower portion is provided in front of the wheel, and
wherein a lower end portion of the inward deflector is disposed below a lower end portion of the flap.

* * * * *